United States Patent

Boulanger et al.

(10) Patent No.: US 10,837,944 B2
(45) Date of Patent: Nov. 17, 2020

(54) RESONATOR DEVICE FOR RESONANCE MAPPING AND SOUND PRODUCTION

(71) Applicant: Harman International Industries, Incorporated, Stamford, CT (US)

(72) Inventors: Adam Boulanger, Palo Alto, CA (US); Sven Kratz, San Jose, CA (US); Stefan Marti, Oakland, CA (US); Joseph Verbeke, San Francisco, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 184 days.

(21) Appl. No.: 15/890,146

(22) Filed: Feb. 6, 2018

(65) Prior Publication Data

US 2019/0242852 A1  Aug. 8, 2019

(51) Int. Cl.
| | | |
|---|---|---|
| *G10K 11/34* | (2006.01) | |
| *G01H 13/00* | (2006.01) | |
| *G01H 1/00* | (2006.01) | |
| *G01H 17/00* | (2006.01) | |
| *G01N 29/04* | (2006.01) | |

(52) U.S. Cl.
CPC .......... *G01N 29/041* (2013.01); *G01H 1/00* (2013.01); *G01H 13/00* (2013.01); *G01H 17/00* (2013.01); *G10K 11/346* (2013.01); *G01N 2291/014* (2013.01); *G01N 2291/2632* (2013.01)

(58) Field of Classification Search
CPC .......... G01N 29/041; G01N 2291/014; G01N 2291/2632; G10K 11/346
USPC .......................................... 73/579
See application file for complete search history.

(56) References Cited

U.S. PATENT DOCUMENTS

| 5,185,801 A | 2/1993 | Meyer et al. |
| 5,687,293 A * | 11/1997 | Snell ..................... B25J 9/1692 |
| | | 318/568.13 |
| 7,395,706 B2 * | 7/2008 | Pan ........................ G01N 25/00 |
| | | 250/288 |
| 9,703,288 B1 * | 7/2017 | Zhang ................. H04N 5/2257 |
| 9,731,816 B2 * | 8/2017 | Harris, III ............... B64C 25/14 |
| 2002/0060267 A1 | 5/2002 | Yavnai |
| 2005/0271221 A1 | 12/2005 | Cerwin |
| 2007/0200027 A1 | 8/2007 | Johnson |

(Continued)

FOREIGN PATENT DOCUMENTS

| FR | 2 974 631 A1 | 11/2012 |
| WO | 2013/150374 A1 | 10/2013 |

(Continued)

OTHER PUBLICATIONS

International Search Report for application No. PCT/US2018/017225 dated Oct. 23, 2018.

(Continued)

*Primary Examiner* — Jacques M Saint Surin
(74) *Attorney, Agent, or Firm* — Artegis Law Group, LLP

(57) ABSTRACT

One embodiment of the present disclosure set forth a resonator device for generating a resonance map of a surface. The resonator device includes an actuator mechanism that vibrates the surface. The resonator device further includes one or more sensors that detect a deflection of the surface responsive to the actuator mechanism vibrating the surface. The resonator device further includes a processor. The processor is configured to generate the resonance map based on the detected deflection.

19 Claims, 9 Drawing Sheets

(56) References Cited

U.S. PATENT DOCUMENTS

| | | | |
|---|---|---|---|
| 2008/0212819 A1 | 9/2008 | Cerwin et al. | |
| 2010/0201807 A1 | 8/2010 | McPherson | |
| 2013/0050652 A1 | 2/2013 | Wharton | |
| 2013/0166103 A1 | 6/2013 | Ko | |
| 2014/0132208 A1* | 5/2014 | Fisher | H02J 50/12 |
| | | | 320/108 |
| 2014/0211086 A1 | 7/2014 | Wharton et al. | |
| 2016/0375997 A1 | 12/2016 | Welsh et al. | |

FOREIGN PATENT DOCUMENTS

| | | |
|---|---|---|
| WO | 2014/032709 A1 | 3/2014 |
| WO | 2016/029469 A1 | 3/2016 |

OTHER PUBLICATIONS

Emmanuelle Guibert: "Etude vibroacoustique et perceptive du bruit rayonnéà 'intérieur d'une voiture de Train à Grande Vitesse", URL:https://tel.archives-ouvertes.fr/tel-00365400v1/document, Jun. 8, 2010, 56 pages.

Pierre Argoul: "Vibrations de poutres et de plaques", Jan. 1, 2016, URL:https://educnet.enpc.fr/pluginfile.php /30206/mod_resource/content/2Vibrationsde spoutresetdesplaques2016.pdf, 82 pages.

Sojeong et al., "Advanced Sound Capturing Method with Adaptive Noise Reduction System for Broadcasting Multicopters", 2015 IEEE International Conference on Consumer Electronics (ICCE), Jan. 9-12, 2015, pp. 26-29.

"Hövding—Airbag for urban cyclists: How it works," retrieved from http://www.hovding.com/how_hovding_works//? p=en/how_it_works/, retrieved on Jan. 1, 2017, 11 pages.

"Protective Fabric Mars Landing Airbags:: Warwick Mills," retrieved from http://www.warwickmills.com/Protective-Fabrics-Mars.aspx, retrieved on Jan. 1, 2017, 2 pages.

"What is a Gimbal?—QuadcopterHQ.com," retrieved from http://quadcopterhq.com/what-is-a-gimbal/, Dec. 2, 2013, 5 pages.

"Xconomist of the Week: Helen Greiner's CyPhy Works Unveils Drones I Xconomy," retrieved from https://www.xconomy.com/boston/2012/12/03/xconomist-of-the-week-helen-greniers-cyphy-works-unveils-drones/, Dec. 3, 2012, 3 pages.

"Grizzly Analytics," retrieved from http://www.grizzlyanalytics.com/home.html, retrieved on Jan. 1, 2017, 4 pages.

Extended European Search Report for EP Application No. 16167374.4, dated Aug. 5, 2016.

* cited by examiner

RESONATOR DEVICE FOR RESONANCE MAPPING AND SOUND PRODUCTION

BACKGROUND

Field of the Embodiments

The various embodiments relate generally to surface resonance and, more specifically, to a resonator device for resonance mapping and sound production.

Description of the Related Art

Sound consists of pressure waves that can generate small deformations on a surface. When sound is generated on one side of the surface, pressure waves from the sound impact the surface. The surface absorbs the energy from the pressure waves causing the surface to vibrate. As the surface vibrates, air on an opposing side of the surface absorbs the energy of the surface vibrations. The absorbed energy causes the air molecules to vibrate generating pressure waves on the other side of the surface. These pressure waves travel through the space delivering sound on the other side of the surface. In this particular manner, sound can travel through surfaces via surface resonance.

Resonance is a phenomenon in which a vibrating system or external force drives another system to oscillate with greater amplitude at specific frequencies. Frequencies at which the response amplitude is a relative maximum are known as the system's resonant frequencies or resonance frequencies. For example, an acoustic transducer may produce an audio signal at various frequencies. When the acoustic transducer is placed on a surface, a mechanical connection may be established between the surface and the acoustic transducer. Accordingly, when the acoustic transducer produces sound, the acoustical transducer may vibrate the surface at a corresponding frequency. In particular, if the frequency at which the acoustic transducer vibrates matches a resonance frequency of the surface, then the surface may amplify the sound produced by the acoustic transducer.

Accordingly, depending on the material and geometric properties of a surface, sound at one or more frequencies may be transmitted more effectively through and/or by a surface than sound at another frequency. Frequencies that are transmitted more effectively by a surface are termed resonance frequencies of the surface. Each surface may have one or more resonance frequencies. Understanding the resonance frequencies of a surface can be helpful for a variety of applications. For example, sound isolation technologies may selectively suppress one or more resonance frequencies of a surface to reduce the amount of sound that can travel through a surface via surface resonance.

Conventionally, to determine the resonance frequencies of different surfaces, each surface tested separately. Variations in surface materials and geometries affect the resonance frequency of each surface. The frequencies that are transmitted most effectively by each surface material and geometry may be cataloged to generate a look-up table of resonance frequencies for various types of surfaces.

One drawback of conventional techniques for determining the resonance frequencies of a surface is that they do not accurately predict shifts in resonance frequencies due to manufacturing and construction processes. In particular, inserting screws and holes in a surface may dramatically shift the resonance frequencies of a surface. Furthermore, fastening different types of surfaces to each other may alter the resonance frequencies of both surfaces. Accordingly, the resonance frequencies of a surface in isolation may be different from the resonance frequencies of the same surface within a complex structure, such as a building. Thus, conventional techniques for determining the resonance frequencies of a surface may prove ineffective in accurately predicting the resonance frequencies of a surface after various manufacturing and construction processes.

As the foregoing illustrates, techniques for more effectively determining the resonance frequencies of a surface are needed.

SUMMARY

Embodiments of the present disclosure set forth a resonator device for generating a resonance map of a surface. The resonator device includes an actuator mechanism that vibrates the surface. The resonator device further includes one or more sensors that detect a deflection of the surface responsive to the actuator mechanism vibrating the surface. The resonator device further includes a processor. The processor is configured to generate the resonance map based on the detected deflection.

Further embodiments provide, among other things, a computer-readable medium and a method configured to implement the techniques set forth above.

At least one advantage of the techniques described herein is that the resonator device can determine the resonance frequencies of a surface after the surface is already assembled. Accordingly, the resonator device can more accurately detect the resonance frequencies of the surface over conventional techniques that only test the resonance frequencies of surfaces before the surface is included in a structure. In addition, the resonator device is mobile and can access hard-to-reach surfaces and/or surfaces located in parts of a structure that are unsafe for a human to access. Thus, the resonator device increases the number of surfaces that can be tested, while improving the safety of resonance testing for users. Finally, the resonator device can also implement a resonance map to vibrate surfaces to produce sound. The produced sound can be used for a variety of purposes such as noise cancellation and entertainment audio production.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

Figure 1:
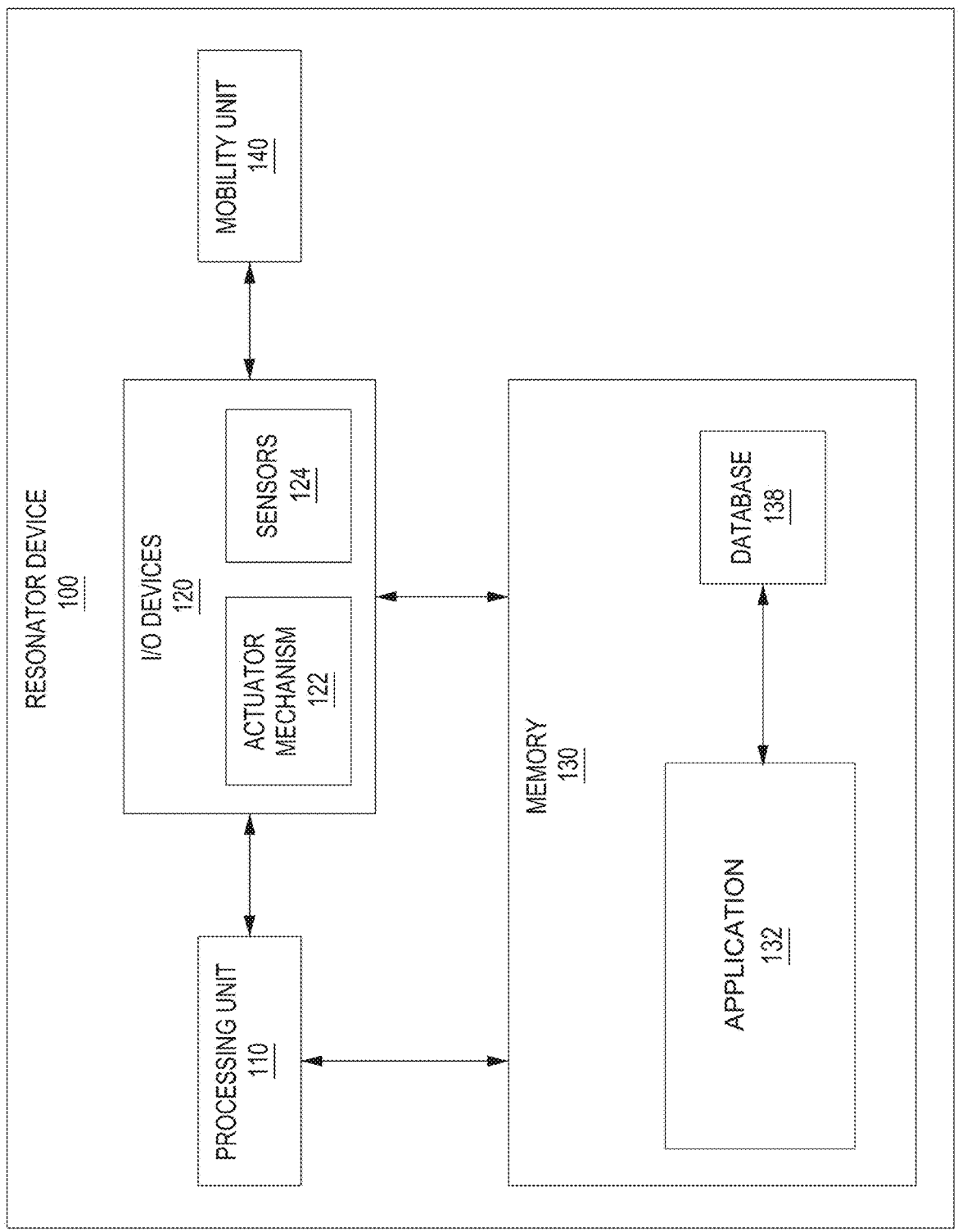
FIG. 1 illustrates a block diagram of a computing device configured to implement one or more aspects of the present disclosure, according to various embodiments.

FIG. 1 illustrates a block diagram of a computing device configured to implement one or more aspects of the present disclosure, according to various embodiments. As shown, resonator device 100 includes processing unit 110, input/output (I/O) devices 120, memory 130, and mobility unit 140.

Processing unit 110 may include one or more of a central processing unit (CPU), a digital signal processing unit (DSP), a sensor processing unit, a controller unit, and so forth. Processing unit 110 may be physically embedded into resonator device 100, may be part of a cloud-based computing environment, and/or may be partially included in an external controller, such as a remote control, a laptop computer, a mobile or wearable device, and so forth. Processing unit 110 is configured to execute applications included in memory 130.

Input/output (I/O) devices 120 include actuator mechanism 122 and sensors 124. Actuator mechanism 122 may include various types of actuators with linear, rotary, and/or oscillatory actuator mechanisms. In particular, actuator mechanism 122 may include linear actuators, valve actuators, piezoelectric actuators, electromagnetic actuators and solenoids, electrohydraulic actuators, sliders, stages, pistons, electroacoustic transducers, and pneumatic valve actuators. In operation, actuator mechanism 122 may apply a direct mechanical force to a surface to induce a deformation in the surface. The mechanical force may be applied incident to the surface or at an angle to the surface normal. Additionally or alternatively, actuator mechanism 122 may include acoustic transducers that actuate air close to the surface to induce a deformation in the surface. In addition, a phased array of transducers may be implemented in generating deformations in the surface. In various embodiments, actuator mechanism 122 may include a gimbaling system that rotates to actuate various parts of a surface. Actuator mechanism 122 may be located at various positions in or around resonator device 100. For example, actuator mechanism 122 may be located on an external frame of resonator device 100 and/or may be located within resonator device 100.

Sensors 124 generate sensor data that indicates a position of resonator device 100 on a surface and/or in an environment around the surface. For instance, sensors 124 may include optical sensors (e.g., RGB image sensors), ultrasonic range finders, acoustic sensors, thermal sensors, inertial measurement units (e.g., gyroscopes, accelerometers and magnetometers), tilt switches, time-of-flight sensors (e.g., depth map sensors). In addition, I/O devices 120 may include light detection and ranging (LIDAR) and radio detection and ranging (RADAR) based sensors, global navigation satellite system (GNSS) sensors, Bluetooth® and Wi-Fi® networking modules, wireless transmitters and receivers, etc. that assist in localizing resonator device 100 on the surface. For example, a GNSS receiver may receive a location of resonator device 100 on the surface and may transmit that location to processing unit 110. In various embodiments, acoustic sensors may be any type of sensor that can detect acoustical waves (i.e., pressure waves). In some embodiments, acoustic sensors may include microphones, ultrasonic transducers, and so forth.

In addition, sensors 124 may generate sensor data that indicates aspects of deformation of the surface generated by actuator mechanism 122. For example, sensors 124 could generate sensor data that indicates an amplitude of the deformation. In particular, sensors 124 could measure the depth of the deformation, the width of the deformation, the shape of the deformation, and so forth. Sensors 124 may include various types of sensors that measure deformations in a surface, including contact sensors and optical sensors. Contact sensors may include piezoelectric films, potentiometers, electromagnetic sensors and so forth. Optical sensors may include imaging sensors (e.g., RGB image sensors), laser distance measurement systems (e.g., LIDAR-based sensors), and structured light sensors. In addition, any or all of the sensors listed above may be implemented in measuring surface deformations. Additionally or alternatively, various transducers in actuator mechanism 122 may be implemented in detecting surface resonance that may result from repeatedly deforming a surface. Sensors 124 may be located at various positions in or around of resonator device 100. For example, sensors 124 may be located on an external frame of resonator device 100, may be located within resonator device 100, or may be located external to resonator device 100.

In some embodiments, I/O devices 120 may also coordinate the transfer of data between an external data repository and resonator device 100. In particular, external data repository could store a relative location of a surface or an environment. For example, external data repository could store an absolute location of the surface or environment, one or more properties of the surface material, a highest, lowest, and/or average resonance frequency of the surface, a change in resonance frequencies between locations of the surface, a set of resonance frequencies tested on the surface, a deformation of the surface, and a type of actuator used to vibrate the surface. In addition, the external repository may also store a path along which resonator device 100 traverses the surface, a time-course indicating the locations and time at which each location was vibrated by an actuator, and various ambient measurements of the surface and/or environment, such as a time of day, temperature, wind speed, noise floor, etc. Further, the external data repository may also store previously generated resonance maps in addition to architectural diagrams, blueprints, plans, computer aided design drawings, and other types of information for processing surface measurements and environmental conditions.

Mobility unit 140 provides a mechanism for moving resonator device 100 between various locations of a surface. In various embodiments, mobility unit 140 may include mechanical and electronic components for moving resonator device 100 between different locations of a surface. For example, mechanical components may include various types of appendages, pulley systems, servo arms, and so forth. Electrical components may include motors, actuators, batteries, servos, and so forth. In addition, mobility unit 140 may include control systems for controlling and coordinating the activation of the various mechanical and electric components included in mobility unit 140. In addition, the control systems may actively monitor the performance and condition of the mechanical and electrical components. In some embodiments, mobility unit 140 may further automatically upgrade and/or provide notifications indicating that a component should be upgraded, serviced, or replaced. For example, mobility unit 140 could display an indicator light when a battery is low. Additionally or alternatively, mobility unit 140 could switch the power source to an on-board reserve power source when the battery power is low, such as a reserve battery pack.

Mobility unit 140 may include a wheel-base and/or treads that facilitates mobility unit 140 in traveling on a surface. Additionally or alternatively, mobility unit 140 may include springs, pneumatic systems, and/or other types of propulsion systems that can move resonator device 100 along a surface and/or in 3D space. In addition, mobility unit 140 may include an aerial system, such as a quadcopter, drone, flying robot, small helicopter, and so forth that enables mobility unit 140 to move resonator device 100 in 3D space to various parts of a surface. Additionally or alternatively, mobility unit 140 may include one or more of passive propulsion (e.g., a wind sail) and active propulsion (e.g., gas and/or electric powered propulsion systems, propeller systems, hover systems, etc.). In various embodiments, mobility unit 140 may enable resonator device 100 to traverse vertically-oriented surfaces. In particular, mobility unit 140 may be configured to adhere to a surface and/or to suspend from the surface. For example, mobility unit 140 may travel along a set of suspended cables. Resonator device 100 may also be suspended from guy-wire or rigging system. Mobility system 140 may adjust the tension and/or length of one or more guy-wires to adjust the position of resonator device 100 in three-dimensions. In addition, mobility unit 140 may include tactile and/or adhesive structures, such as directionally adhesive surface climbing pads. Mobility unit 140 may implement adhesive structures to access and/or suspend resonator device 100 from surfaces with various orientations. Furthermore, mobility unit 140 may be implemented on a rail system implemented along or around a surface.

Mobility unit 140 may move resonator device 100 using a variety of chemical and/or electrical propulsion systems. In alternative embodiments, mobility unit 140 may be partially or entirely powered by chemical-based power sources—such as an internal or external combustion engines. For example, mobility unit 140 may displace one or more appendages via energy released from chemical reactions—such as combustion reactions.

Memory 130 includes a application 132 configured to communicate with database 138. Application 132 includes a mapping module 134 and a sound production module 136. Processing unit 110 executes application 132 to implement the overall functionality of resonator device 100. Memory 130 may be embedded in resonator device 100 or may be stored in an external controller and/or may be included in a cloud-based computing environment.

Database 138 may store one or more resonance maps of a surface. The resonance map may include a sequence of data points. Each data point may include a location on a surface, a type of actuator used to vibrate the surface, an actuation force or set of forces, an actuation frequency or set of frequencies, a deflection of the surface, a shape, size, or dimension of a surface deformation generated on the surface, and so forth. In addition, database 138 may store some or all of the data included in the external data repository.

Mapping module 134 coordinates the detection of resonance frequencies of a surface and the generation of a resonance map of the surface. In particular, mapping module 134 implements one or more surface covering algorithms to determine a path along which mobility unit 140 should move resonator device 100. Various surface covering algorithms may be implemented including, without limitation, random walk based algorithms, spiral motion based algorithms, terrain covering algorithms, and so forth. Mapping module 134 may implement one or more surface covering algorithms to select a first location of the surface. Mapping module 134 may configure mobility unit 140 to move resonator device 100 to the first location. Mapping module 134 may further configure sensors 124 to determine an absolute position of resonator device 100 and or a relative position of resonator device 100 on the surface. For example, mapping module 134 may configure a GNSS receiver to determine an absolution position of resonator device 100. Additionally or alternatively, mapping module 134 may configure a sensor external to resonator device 100 to generate image data and transmitted the image data to mapping module 134 via a local area network, Wi-Fi®, Bluetooth®, etc.

Once at the first location, mapping module 134 configures actuator mechanism 122 to vibrate the surface. In various embodiments, mapping module 134 selects a type of actuator in actuator mechanism 122 to use to vibrate the surface. For example, mapping module 134 could select to use a pneumatic device to vibrate the surface and/or may select a linear actuator to apply direct mechanical force to the surface at an angle to the surface normal. Mapping module 134 also selects an amount of actuation force to apply to the surface. For instance, if the surface is rigid, then mapping module 134 may configure actuator mechanism 122 to apply more force to the surface than if the surface is flexible. In addition, mapping module 134 selects a frequency at which to vibrate the surface. In some embodiments, mapping module 134 may configure actuator mechanism 122 to sequentially vibrate the surface at a set of frequencies. For example, mapping module 134 could configure actuator mechanism 122 to actuate the surface at 180 hertz (Hz), 220 Hz, and 240 Hz.

When a surface vibrates, the surface may locally deform. The depth of the local deformation is herein referred to as a deflection. In addition, the deformation may have a width and a shape. Mapping module 134 configures sensors 124 to detect local deformation in the surface. For example, mapping module 134 could configure one or more optical sensors to generate data that indicates a deflection of the surface. Additionally or alternatively, mapping module 134 could implement one or more contact sensors such as piezoelectric sensors disposed on the surface to detect various characteristics of the surface deformation, such as the deflection and width of the deformation.

Mapping module 134 may process the sensor data to determine the deflection of the surface in response to a particular frequency of vibration. Accordingly, mapping module 134 may determine the deflection, shape, and width of the surface deformation in response to vibrating. Mapping module 134 may store the location, the actuation frequency, and various characteristics of the surface deformation as a data point in a resonance map stored in database 138. Mapping module 134 may further access I/O device 120 to determine one or more parameters of the environment, such as a temperature, a wind speed, a time of day, etc. Mapping module 134 may also store these parameters in the data point included in the resonance map.

For each location, mapping module 134 may configure actuator mechanism 122 to vibrate the surface with various types of actuation patterns. For example, mapping module 134 may configure actuator mechanism 122 to vary one or more of an actuation frequency and an actuation force on the surface. For each actuation pattern, mapping module 134 may configure sensors 124 to generate sensor data that indicates various parameters of a surface deformation generated by the surface vibrations in response to the particular actuation pattern. Mapping module 134 may further store actuation pattern-surface deformation pairs in the data point corresponding to the particular location of the surface. In other embodiments, mapping module 134 may only store an actuation frequency that generates the largest deflection. Such actuation frequency may correspond to a resonance mode of the surface—a frequency that is readily transmitted through a surface via surface resonance.

In other embodiments, mapping module 134 configures one or more sensors 124 to measure a frequency and amplitude of pressure waves generated by the surface vibrating. For example, a microphone may be implemented to measure the loudness of the pressure waves generated by the surface. Mapping module 134 may utilize the detected frequency and amplitude in determining a resonance mode of the surface. For example, mapping module 134 could determine the actuation frequency and/or actuation pattern that corresponds to the largest detected amplitude and/or to a particular detected frequency. Mapping module 134 could store that actuation frequency and the corresponding detected frequency and amplitude in a data point in the resonance map.

Based on one or more parameters of the surface deformation or the detected pressure waves generated by the surface, mapping module 134 determines a subsequent location of the surface to vibrate. In some embodiments, mapping module 134 determines if the largest deflection of the surface at the first location is larger than a threshold. If the deflection is larger than the threshold, then mapping module 134 selects a location that is a larger distance away from the first location. If the deflection is below the threshold, then mapping module 134 selects a location that is a smaller distance away from the first location. For example, a threshold could be 2 millimeters. If the deflection of a first threshold is larger than 2 millimeters, then mapping module 134 configures mobility unit 140 to move resonator device 100 2 centimeters. If the deflection of the first threshold is less than 2 millimeters, then mapping module 134 configures mobility unit 140 to move resonator device 100 1 millimeter. However, the above numbers are purely exemplary and the threshold and/or the resulting step size could be larger or smaller. Additionally or alternatively, mapping module 134 may implement one or more other characteristics of the surface deformation to determine a step size for determining a second location of a surface to vibrate. Mapping module 134 may further implement a surface covering algorithm to determine a direction in which to configure mobility unit 140 to move resonator device 100 and/or the location to which mobility unit 140 should move resonator device 100.

In various embodiments, resonator device 100 is connected to an external controller, such as via a local area network, Wi-Fi®, Bluetooth®, radio transmitters and receivers, and so forth. Mapping module 134 may receive control inputs via I/O devices 120 that configure resonator device 100 to execute the core functionality of mapping module 134, including, but not limited to, selecting a surface covering algorithm to implementing, selecting a location of a surface to vibrate, selecting a type of actuator to use in vibrating the surface, selecting an actuation frequency and/or actuation pattern to use in vibrating the surface, selecting one or more parameters of the surface deformation to detect and measure, and selecting data to include in the resonance map.

In addition, mapping module 134 may update a pre-existing resonance map. Accordingly, mapping module 134 may select a set of locations on the pre-existing resonance map to vibrate, a set of actuation frequencies and/or actuation patterns to implement on the surface, and various characteristics of the surface deformation to measure and store in an updated or new data point in the pre-existing resonance map.

Additionally or alternatively, mapping module 134 may control two or more resonator devices 100. Mapping module 134 may coordinate the movements of each resonator device 100 each vibrate different locations of the surface or to use different actuation tools, frequencies, or patterns on similar locations on the surface. In another embodiment, each resonator device 100 includes a separate mapping module 134 that is networked via a local area network, Wi-Fi®, Bluetooth®, radio transmitters and receivers, and so forth. Each mapping module 134 may coordinate with another mapping module 134 in determine a set of locations of the surface to vibrate and/or a set of actuation tools, frequencies, or patterns to use in vibrating various locations of the surface. Each mapping module 134 may store the resulting resonance map in a shared database 138 or in separate databases 138.

Sound production module 136 configures resonator device 100 to generate a sound tone via vibrating various locations of a surface. In operation, sound production module 136 receives a sound tone to produce via I/O devices 120. For example, I/O devices 120 may receive a sound tone to produce over a network from a user, a noise cancellation system, a sound isolation system, an entertainment system, and so forth. Additionally or alternatively, database 138 may store one or more sound tones to generate and/or I/O devices 120 may access and external data repository to determine one or more sound tones to generate. Sound production module 136 analyzes the sound tone to identify one or more component frequencies of the sound tone. Sound production module 136 further selects one or more component frequency to generate.

In addition, sound production module 136 accesses a resonance map to determine a location of the surface to vibrate. For example, sound production module 136 may access one or more resonance maps stored in database 138. Additionally or alternatively, sound production module 136 may access resonance maps stored in an external data repository via I/O devices 120 to determine a location of the surface to vibrate.

In particular, sound production module 136 searches through data points in the resonance map to select a location to vibrate based on the received sound tone and actuator mechanism 122. In various embodiments, sound production module 136 selects the location with the largest deflection to the given sound tone frequency. Additionally or alternatively, sound production module 136 may receive a location of the surface to vibrate from an external controller.

Sound production module 136 configures mobility unit 140 to move resonator device 100 to the selected location. Sound production module 136 may generate a path between the current location of the resonator device 100 and the selected location of the surface. For example, sound production module 136 may configure sensors 124 to determine the absolute position of resonator device 100. Additionally or alternatively, sound production module 136 may configure one or more sensors 124 located external to resonator device 100 to detect a position of resonator device 100 relative to the surface. Sound production module 136 may determine a current position of resonator device 100 on the resonance map by using either or both of the absolute position or the relative position of resonator device 100 on the surface. Based on the current position of resonator device 100 in the resonance map, sound production module 136 may plot a path to the selected location of the surface for vibrating.

Sound production module 136 may configure sensors 124 to generate sensor data within each sensor's field-of-view to determine if any obstacles are present along the designated path. Sound production module 136 may modify the designated path to avoid detected obstacles. Additionally or alternatively, sound production module 136 may configure sensors 124 to monitor the designated path as resonator device 100 moves towards the selected. Sound production module 136 may implement one or more course-correction algorithms if an obstacle is detected along the designated path as resonator device 100 moves towards the selected location.

Once resonator device 100 reaches the selected location, sound production module 136 configures actuator mechanism 122 to vibrate the surface to generate the sound tone. In particular, sound production module 136 may configure the actuator mechanism to vibrate the surface with a particular actuation force and/or actuation frequency. In various embodiments the actuation force and actuation frequency is based on the actuation force and actuation frequency stored the resonance map. However, sound production module 136 may select a higher or lower actuation force and/or actuation frequency based on environmental conditions and/or the type of actuator mechanism 122 being used to vibrate the surface. For example, if the humidity around a surface increases, then sound production module 136 may implement a small increase in the actuation frequency used to vibrate the surface in order to reducing any humidity-induced damping effects.

In other embodiments, sound production module 136 searches through resonance map 600 to determine one or more locations of surface 310 that exhibit a small deflection when vibrated. Sound production module 136 may further configure one or more beam forming speakers to output the received audio signal to a location of surface 310 that exhibits a small deflection when vibrated. Accordingly, the selected location of surface 310 may reflect audio sound effectively due to the small deflection response of the surface. In this manner, sound production module 136 may configure resonator device 100 to transmit audio to one or more selected locations by reflecting audio signals off of non-resonant locations of surface 310.

In various embodiments, multiple resonator devices 100 may be implemented to vibrate a surface. In such embodiments, each sound production module 136 may configure a resonator device 100 to vibrate a different location of a surface and/or a different surface. In various embodiments, each sound production module 136 may select a single frequency from a multi-frequency sound tone to produce. Additionally or alternatively, each resonator device 100 may be networked via a local area network or similar networking system. Accordingly, each sound production module 136 may configure a corresponding resonator device 100 to vibrate the surface at sequential time intervals. Furthermore, a central sound production module 136 may coordinate the movement of multiple resonator devices 100 and may configure various actuator mechanisms 122 included in each resonator device 100 to vibrate the surface during a particular time interval and with a particular actuation frequency and actuation force.

Figure 2:
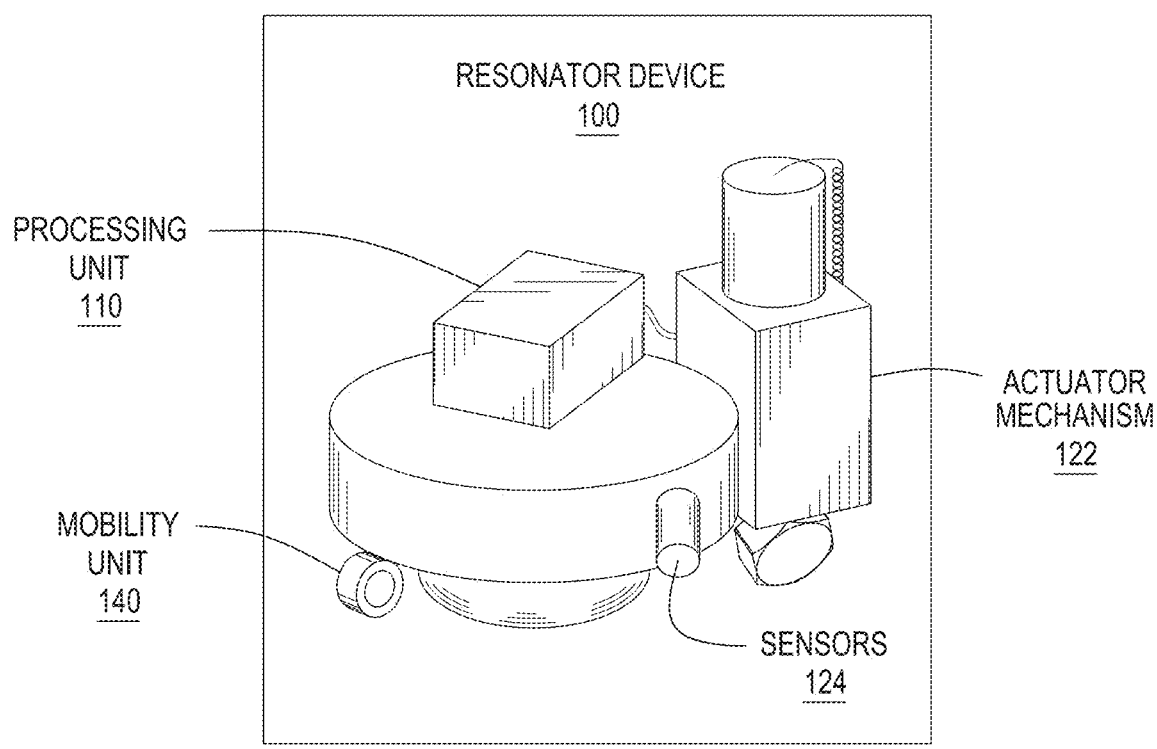
FIG. 2 illustrates a resonator device for implementing various embodiments of the present disclosure.

FIG. 2 illustrates a system configuration for implementing various embodiments of the present disclosure. As shown, resonator device 100 includes processing unit 110, actuator mechanism 122, sensors 124, and mobility unit 140. In various embodiments, processing unit 110, actuator mechanism 122, sensors 124, and mobility unit 140 may be collocated in resonator device 100. Alternatively, processing unit 110 and/or sensors 124 may be located external to resonator device 100. Data and control signals may be transferred between processing unit 110 and/or sensors 124 and resonator device 100 via a network.

As stated above, mobility unit 140 may be any type of locomotion system that can move resonator device 100 between various locations of a surface. Actuator mechanism 122 may be any type of device capable of vibrating a surface. Actuator mechanism 122 may include various types of actuators that apply direct mechanical force into a surface and/or an electroacoustic transducer that directs pressure waves to the surface. Sensors 124 may be configured to detect a location of resonator device 220 on a surface, to detect obstacles around resonator device 100, and to detect various characteristics of the surface, such as surface deformations. In particular, processing unit 110 configures sensors 124 to detect a deflection of the surface to actuators in the actuator mechanism 122 vibrating the surface.

Figure 3A:
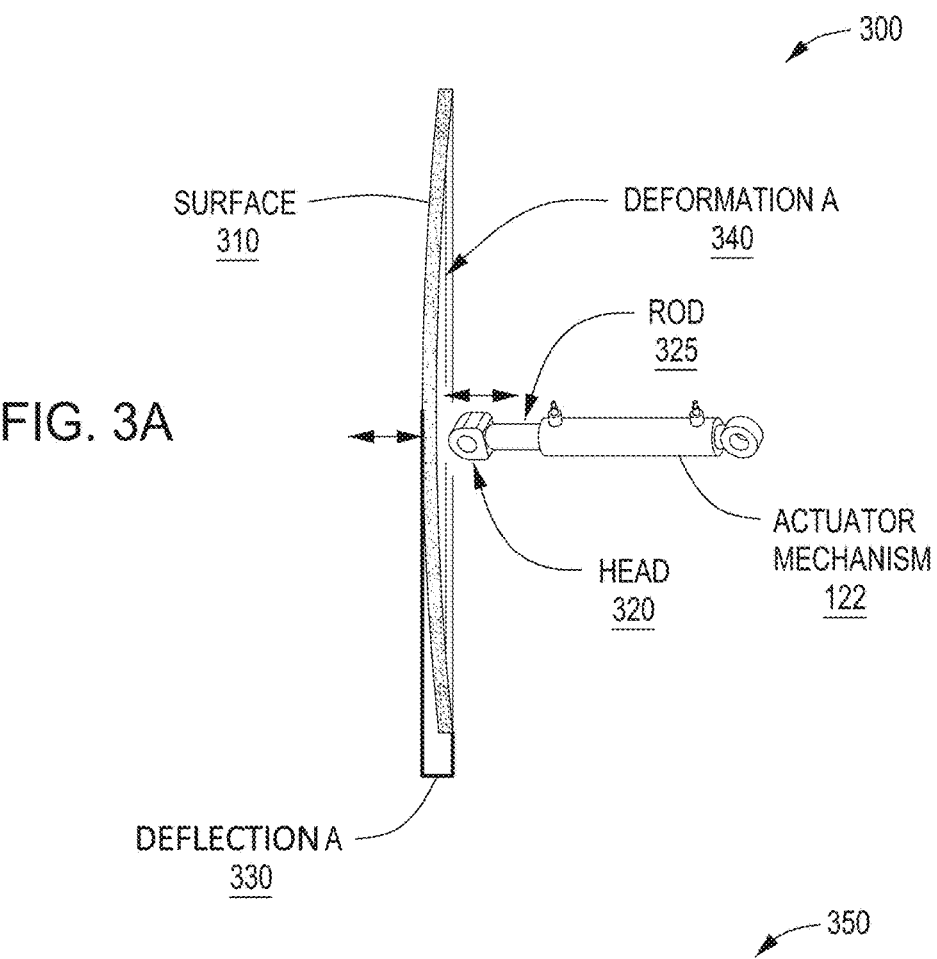
FIGS. 3A-3B illustrate an actuator mechanism for vibrating a surface, according to various embodiments.
Figure 3B:
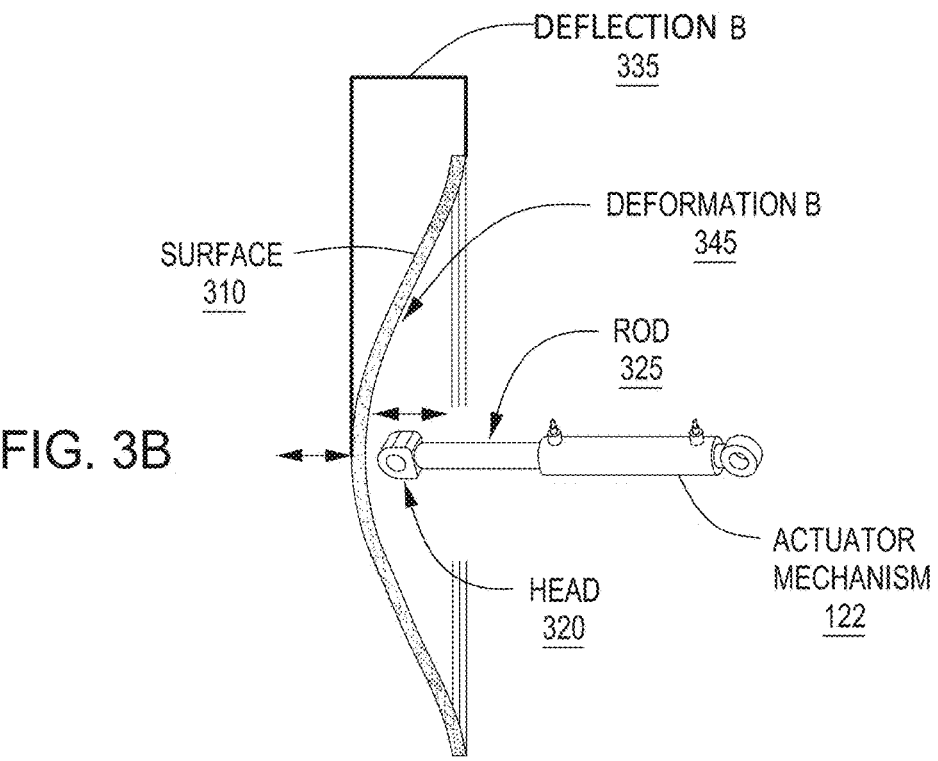

FIGS. 3A-3B illustrate an actuator mechanism 122 for vibrating surface 310, according to various embodiments. As shown, system environment 300 includes surface 310 and actuator mechanism 122. Surface 310 includes deformation A 340 with deflection A 330. As shown, head 320 applies a direct mechanical force on surface 310. In various embodiments, mapping module 134 configures actuator mechanism 122 to adjust the length of rod 325 in order to place head 320 in contact with surface 310. In addition, mapping module 134 may configure actuator mechanism 122 to further extend rod 325 in order to cause head 320 to exert a force on surface 310. Mapping module 134 selects the magnitude of the exerted force based on various properties of surface 310 and actuator mechanism 122. For example, if surface 310 is rigid, then mapping module 134 may configure actuator mechanism 122 to increase the magnitude of the force exerted by head 320 on surface 310. Alternatively, if surface 310 is flexible, then mapping module 134 may configure actuator mechanism 122 to decrease the magnitude of the force exerted by head 320 on surface 310. Additionally or alternatively, mapping module 134 may select the magnitude of the exerted force based on a threshold force that actuator mechanism 122 can produce.

In various embodiments, mapping module 134 may configure actuator mechanism 122 to vary the magnitude of the exerted force on surface 310 over time. For example, mapping module 134 may configure actuator mechanism 122 to cause the exerted force on surface 310 to vary between a maximum force and a minimum force during one or more intervals of time. In particular, mapping module 134 may configure actuator mechanism 122 to vary the force exerted by head 320 with a specific actuation frequency. The change in the exerted force vibrates surface 310 with a corresponding frequency. When surface 310 vibrates, a stress force is generated in surface 310. When the stress force exceeds a threshold, the external shape of surface 310 may change around a contact area between surface 310 and head 320. For example, deformation A 340 may be generated in surface 310. Various aspects of deformation A 340 are determined by the stress force generated by actuator mechanism 122 in surface 310. For example, mapping module 134 may vary deflection A 330, a shape, and/or a cross-sectional length of deformation A 340 by configuring actuator mechanism 122 to vary an actuation force and/or actuation frequency used in vibrating surface 310.

In various embodiments, mapping module 134 may also modify an angle at which actuator mechanism 122 exerts an actuation force on surface 310. For example, actuator mechanism 122 may include a gimbal mechanism that rotates rod 325 and head 320 at various angles to surface 310. Accordingly, mapping module 134 may configure actuator mechanism 122 to rotate various components of actuator mechanism 122 in order to direct a force on surface 310 at various angles to the surface normal.

As shown in FIG. 3B, system environment 350 includes surface 310 and actuator mechanism 122. Surface 310 includes deformation B 345 with deflection B 335. In various embodiments, mapping module 134 configures actuator mechanism 122 to vary one or more actuation parameters in order to generate different types of deformations on surface 310. For example, mapping module 134 may increase or decrease an average actuation force exerted on surface 310. Mapping module 134 may further increase or decrease an actuation frequency at which head 325 vibrates surface 310. Accordingly, by varying one or more actuation parameters, mapping module 134 may alter various aspects of deformations generated on surface 310. For example, mapping module 134 may increase or decrease a deflection, cross-sectional length, and/or vary a shape of deformations generated on surface 310. In particular, by varying one or more actuation parameters, mapping module 134 may configure actuator mechanism 122 to generate deformation B 345 on surface 310. As shown, deflection B 335 of deformation B 345 in system environment 350 is larger than deflection A 330 of deformation A 340 in system environment 300. Accordingly, rod 325 in system environment 350 extends further out of actuator mechanism 122 than in system environment 300 in order to place head 320 in contact with surface 310.

In addition, mapping module 134 configures sensors 124 to generate sensor data that can be used in determining on or more aspects of deformation B 345, such as deflection B 335. Mapping module 134 processes the sensor data to determine a value of deflection B 335. Mapping module 134 may also process the sensor data to determine other aspects of deformation B 345, such as a cross-sectional length and a shape.

Mapping module 134 may further vary one or more actuation parameters of the actuator mechanism 122 to optimize one or more aspects of deformation B 345. For instance, mapping module 134 may vary one or more actuation parameters to maximize deflection B 335 of deformation B 345. Mapping module 134 could vary one or more of the actuation frequency, the actuation force, and the actuation angle of actuator mechanism 122. For each set of actuation parameters, mapping module 134 configures sensors 124 to generate sensor data that can be used in measure deflection B 335. Mapping module 134 further compares measured values for deflection B 335 to determine the actuation parameters associated with the largest value of deflection B 335.

In various embodiments, mapping module 134 may configure actuator mechanism 122 to cycle through various pre-set actuation parameters to optimize one or more aspects of deformation B 345. For example, mapping module 134 may configure actuator mechanism 122 to cycle through a set of actuation frequencies when determining a maximum value of deflection B 335. In other embodiments, mapping module 134 may dynamically configure actuator mechanism 122 to increase or decrease various actuation parameters when optimizing various aspects of deformation B 345. For example, mapping module 134 may dynamically configure actuator mechanism 122 to increase or decrease an average actuation force to minimize a cross-sectional length of deformation B 345.

The actuation parameters associated with the optimized aspects of deformation B 345 may be stored as a data point in a resonance map. The actuation parameters are associated with a location on surface 310. In particular, the actuation frequency that corresponds to the largest deflection of deformation is defined as the resonance frequency of surface 310 at the particular location. Vibrating surface 310 at the resonance frequency may generate pressure waves at the particular resonance frequency. Such pressure waves may be heard as audible sound.

Figure 4:
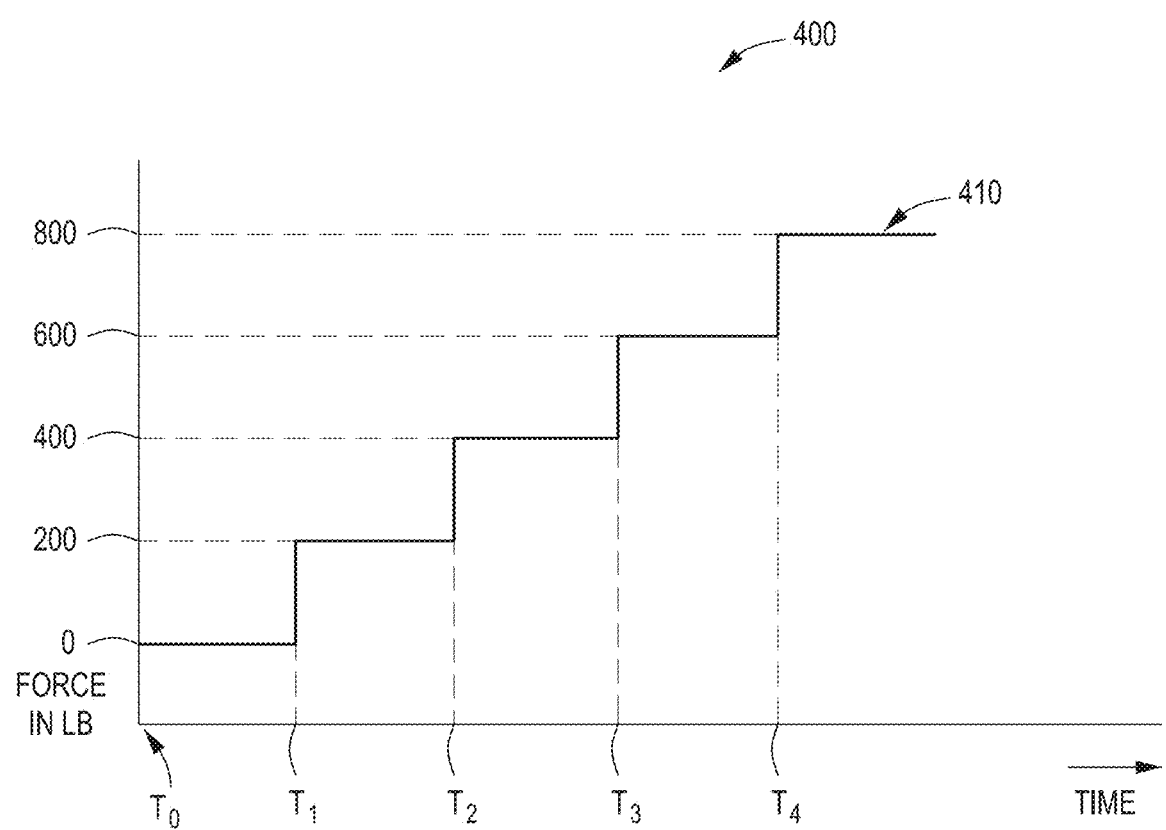
FIG. 4 illustrates an actuation force profile for vibrating a surface, according to various embodiments.

FIG. 4 illustrates an actuation force pattern for vibrating surface 310, according to various embodiments. As shown, graph 400 displays average actuation force 410 plotted as a function of time. In particular, at time T0, mapping module 134 configures actuator mechanism 122 to exert an average actuation force of 0 pounds (lbs.) on surface 310. At time $T_1$, mapping module 134 configures actuator mechanism 122 to increase the average actuation force 410 to 200 lbs. The average actuation force 410 remains at 200 lbs. until time $T_2$, where mapping module 134 configures actuator mechanism 122 to increase average actuation force 410 to 400 lbs. Similarly, at time $T_3$, mapping module 134 configures actuator mechanism 122 to increase the average actuation force 410 to 600 lbs. and at time $T_4$, to 800 lbs.

As described above, mapping module 134 configures actuator mechanism 122 to vibrate surface 310 with a particular actuation frequency. In some embodiments, actuator mechanism 122 applies a direct mechanical force to surface 310, such as via a linear actuator. In other embodiments, actuator mechanism 122 applies a non-contact force to surface 310, such as via an electroacoustic transducer. In various embodiments, a non-contact force may be an interaction between two objects that are spatially separated that changes a characteristics of at least one of the objects. The characteristics may include for example, and without limitation, a position, a velocity, an acceleration, a rotation, a shape, a size, and so forth. In operation, actuator mechanism 122 exerts a time-varying force on surface 310. In particular, the time-varying force generated by actuator mechanism 122 may oscillate between a maximum force and a minimum force. For example, mapping module 134 may configure actuator mechanism 122 to increase or decrease a maximum force and/or a minimum force exerted on surface 310. Additionally or alternatively, mapping module 134 may configure actuator mechanism 122 to vary the actuation force pattern so that the average force exerted on surface 310 is a mean of the maximum force and the minimum force, greater than the mean of the maximum force and the minimum force or less than the mean of the maximum force and the minimum force.

Mapping module 134 configures sensors 124 to generate sensor data that indicates one or more aspects of deformations formed on surface 310. For example, mapping module 134 may configure an optical sensor to generate and project a coded image onto surface 310 for imaging deformations generated by actuator mechanism 122. Mapping module 134 may further configure the optical sensor to generate sensor data that indicates how the image is distorted by the deformation. Mapping module 134 may use the image distortions to determine one or more aspects of a deformation on surface 310. In particular, mapping module 134 may calculate a deflection, a cross-sectional length, and a shape of the deformation. In other embodiments, mapping module 134 may configure sensors 124 to place a passive element on surface 310. The passive element may be a beacon or an inductive element and may be placed on an area of surface 310 that actuator mechanism 122 is vibrating. Mapping module 134 may further configure sensors 122 to detect the displacement of the passive element relative to another section of surface 310 and/or the motion of the passive element on surface 310. Mapping module 134 uses the detected displacement and/or motion of the passive element to determine various aspects of deformations generated on surface 310.

Based on the determine aspects of deformation B 345, mapping module 134 may configure actuator mechanism 122 to adjust the time-varying actuation force exerted on surface 310. For example, between time $T_1$ and time $T_2$, mapping module 134 may analyze sensor data and calculate deflection A 330 of deformation A 340. Mapping module 134 may further configure actuator mechanism 122 to increase the average actuation force 410 to 400 lbs. at time $T_2$. Between time $T_2$ and time $T_3$, mapping module 134 may again analyze sensor data from sensors 124. Mapping module 134 may determine based on sensor data that the deformation on surface 310 now assumes the shape of deformation B 345 with deflection B 335.

Mapping module 134 may further determine deformation deflections when the average actuation force 410 is 600 lbs. and 800 lbs. In some embodiments, mapping module 134 may identify the average actuation force 410 associated with the largest deflection. For example, mapping module 134 may identify deflection B 335 associated with an average actuation force 410 of 400 lbs. as a largest deflection. Mapping module 134 may further generate a data point in a resonance map that indicates that the location of resonator device 100, the average actuation force 410 of 400 lbs., and the actuator frequency of actuator mechanism 122, in addition to other aspects of surface 310, deformation B 345, and actuation parameters of actuator mechanism 122.

Figure 5:
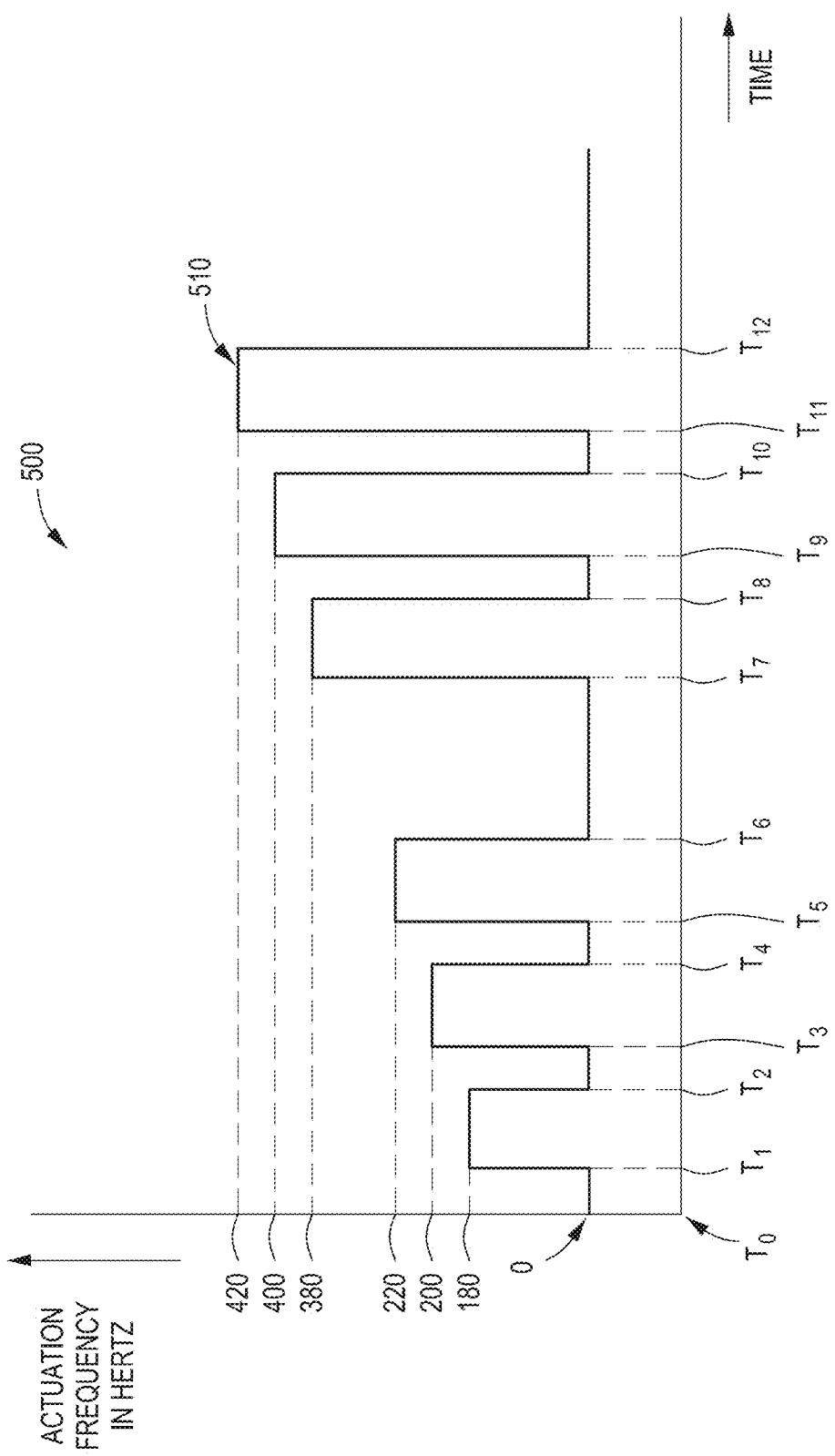
FIG. 5 illustrates an actuation frequency profile for vibrating a surface, according to various embodiments.

FIG. 5 illustrates an actuation frequency pattern for vibrating surface 310, according to various embodiments. As shown, graph 500 displays actuation frequency 510 plotted as a function of time. In various embodiments, mapping module 134 may configure actuator mechanism 122 to exert a time-varying force on surface 310, where the time-varying force has a particular actuation frequency. In particular, at time $T_1$, mapping module 134 configures actuator mechanism 122 to implement an actuation frequency 510 of 180 Hz to a surface. At time $T_2$, mapping module 134 configures actuator mechanism 122 to reduce actuation frequency 510 to 0 Hz. Similarly, at time $T_3$, mapping module 134 configures actuator mechanism 122 to increase actuation frequency 510 to 200 Hz and then return actuation frequency 510 to 0 Hz at time $T_4$. As shown in graph 500, actuation frequency 510 continues to cycle between 0 Hz and sequentially 220 Hz, 380 Hz, 400 Hz, and 420 Hz.

In various embodiments, mapping module 134 configures actuator mechanism 122 to exert a time-varying force on a single location of surface 310 at different actuation frequencies. For example, as shown, mapping module 134 configures actuator mechanism 122 to exert a time-varying force on surface 310 with an actuation frequency of 180 Hz, 200 Hz, 220 Hz, 380 Hz, 400 Hz, and 420 Hz. Exerting a time-varying force on surface 310, causes surface 310 to vibrate and to further deform externally. For example, a deformation A 340 and/or a deformation B 345 may form on surface 310. Mapping module 134 also configures sensors 124 to generate sensor data that indicates various properties of surface 310. For example, a piezoelectric sensor may be disposed on surface 310 proximate to the point of contact of the actuator mechanism 122 and surface 310. The piezoelectric sensor may detect various aspects of deformations in surface 310. For example, the piezoelectric sensor may detect a deflection B 335 of deformation B 345. For each actuation frequency, mapping module 134 may determine various aspects of deformations that form on surface 310. Mapping module 134 may further identify an actuation frequency 510 that corresponds to the largest deflection of deformation B 345 on surface 310. Mapping module 134 may store the identified frequency as a data point in a resonance map. The data point may include a location of resonator device 100, the largest deflection, and the corresponding actuation frequency 510, in addition to various other actuation parameters and aspects of the generated deformation.

In other embodiments, mapping module 134 may configure actuator mechanism 122 to generate a multi-frequency actuation pattern on surface 310. For example, mapping module 134 may configure actuator mechanism 122 to vibrate surface 310 at three frequencies at a time. For example, mapping module 134 may configure actuator mechanism 122 to vibrate surface 310 at 180 Hz, 200 Hz, and 220 Hz. Mapping module 134 may analyze sensor data generated by sensors 124 to determine one or more aspects of deformations that form on surface 310. For example, mapping module may determine that vibrating surface 310 at 180 Hz, 200 Hz, and 220 Hz generates deformation A 340 on surface 310 with deflection A 330.

Next, mapping module 134 may configure actuator mechanism 122 to vibrate surface 310 at 380 Hz, 400 Hz, and 420 Hz. Mapping module 134 may again analyze sensor data generated by sensors 124 to determine one or more aspects of deformations that form on surface 310. For example, mapping module may determine that vibrating surface 310 at 380 Hz, 400 Hz, and 420 Hz generates deformation B 345 on surface 310 with deflection B 335. Mapping module 134 may further identify that deflection B 335 is larger than deflection A 330. Mapping module 134 may then include deflection B 335 in the data point associated with the location of resonator device 100 as well as the set of frequencies (i.e., 380 Hz, 400 Hz, and 420 Hz) at which actuator mechanism 122 vibrated surface 310.

In other embodiments, mapping module 134 may configure actuator mechanism 122 to perform a continuous sweep across a range of frequencies when vibrating surface 310. For example, actuator mechanism 122 may start at a high frequency (e.g., 420 Hz) and sweep downwards to a lower frequency (e.g., 380 Hz) or vice versa. In such embodiments, mapping module 134 may configure sensors 124 to repeatedly measure the maximum deflection produced on surface 310. Accordingly, mapping module 134 may more precisely identify resonance frequencies of a surface 310 relative to testing discrete frequencies. For example, mapping module 134 may identify that 394.7 Hz is a resonance frequency of the surface 310 by implementing the continuous sweep technique.

Figure 6:
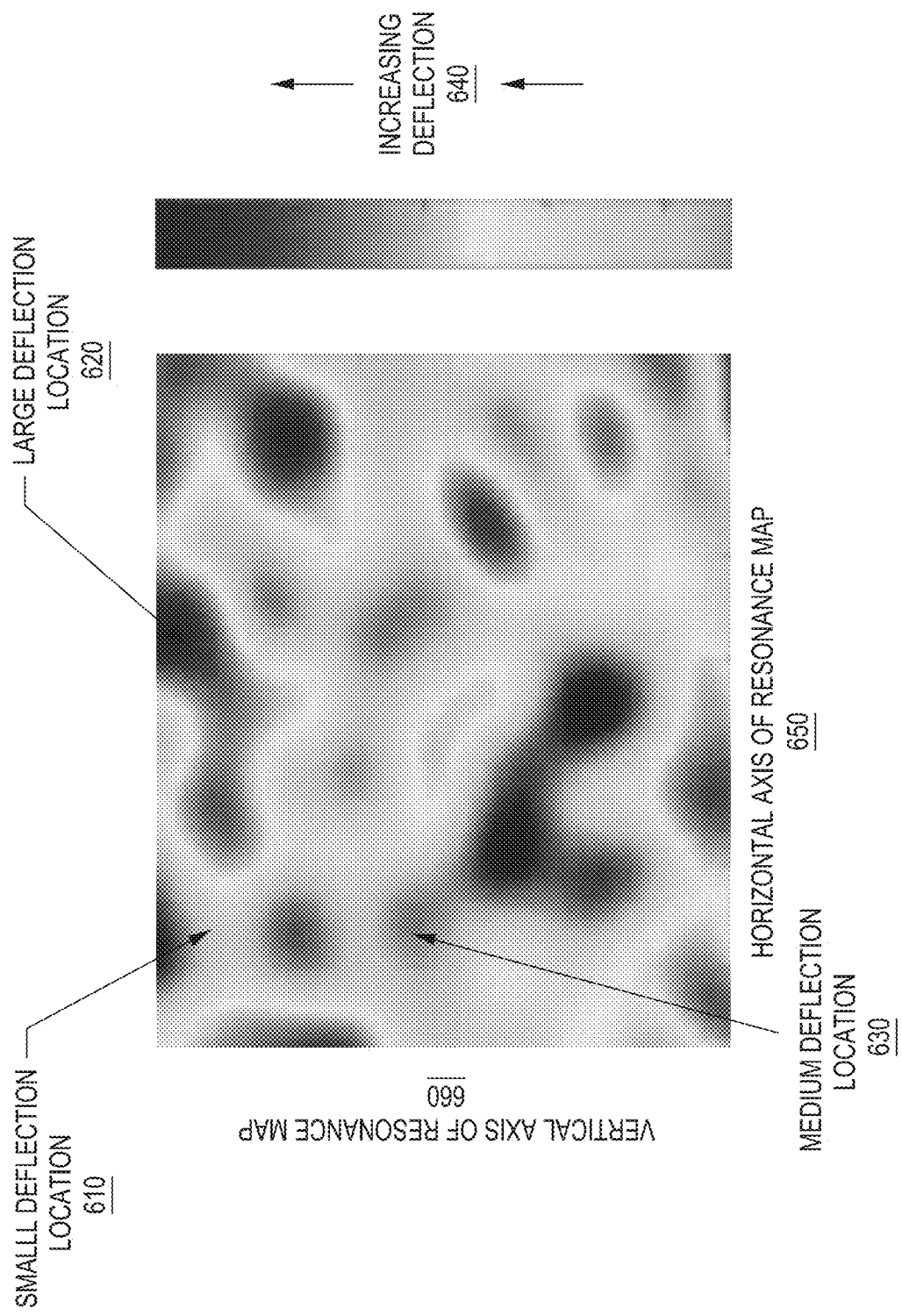
FIG. 6 illustrates a resonance map generated by a application, according to various embodiments.

FIG. 6 illustrates a resonance map 600 generated by resonator device 100, according to various embodiments. Resonance map 600 details the resonance properties of surface 310. In particular, each data point in resonance map 600 includes a location, a largest deflection of surface 310, and a corresponding actuation frequency that generated the largest deflection. For example, in resonance map 600, location 610 generated a small deflection to actuator mechanism 122, while location 620 generated a large deflection. In addition, mapping module 134 may include other actuation parameters, such as average actuation force 410 and an actuation angle, as well as aspects of deformations, such as a cross-sectional length and a shape of the deformation.

In some embodiments, resonance map 600 is a two-dimensional map that reflects various resonance properties of surface 310. Each data point on resonance map 600 corresponds to a location of surface 310. Each data point includes a maximum deflection by which surface 310 can be deformed and a corresponding actuation frequency 510. In addition, a data point may include additional actuation parameters, such as a set of actuation frequencies 510 used to vibrate surface 310 and an average actuation force 410 or set of average actuation forces 410 used to vibrate surface 310 to generate the maximum deflection. Mapping module 134 may also store various other aspects of the resulting deformation, such as a cross-sectional length and a shape.

Furthermore, mapping module 134 may also store actuation parameters that correspond to a minimum or no deflection of surface 310. Such actuation parameters may be implemented in reflecting sound off of surface 310. Mapping module 134 may further store actuation parameters that correspond to non-maximum deflections that are above or below a deflection threshold. Such actuation parameters may provide information about secondary resonance frequencies or near resonance frequencies of a location of surface 310.

To build resonance map 600, mapping module 134 iteratively tests the resonance properties of various locations of surface 310. In particular, mapping module 134 may configure mobility unit 140 to move resonator device 100 to one or more locations on surface 310. At each location, mapping module 134 may configure actuator mechanism 122 to vibrate surface 310 with a particular set of actuation frequencies. For each location, mapping module 134 configures sensors 124 to generate sensor data that reflects a deformation formed at the second location. Mapping module 134 analyzes the sensor data to determine the actuation frequency that corresponds to the largest deflection. Mapping module 134 may then store the corresponding actuation frequency for each location as separate data points in resonance map 600. At each location, mapping module 134 generates a data point that indicates a frequency and/or a set of frequencies that maximizes the deflection of deformations formed on surface 310 in response to actuator mechanism 122 vibrating the surface 310. Accordingly, mapping module 134 may generate a resonance map of a surface 310 that indicates a vibrating frequency that induces the largest deflection response from the surface 310.

In various embodiments, mapping module 134 implements various surface covering algorithms to determine the set of locations of surface 310 to test. For example, mapping module 134 could implement a random walk algorithm that randomly assigns a direction of motion for resonator device 100. Alternatively, mapping module 134 could implement a terrain covering algorithm that assigns a direction based on the past three or more locations of resonator device 100.

In addition, mapping module 134 may implement a deflection threshold to determine a displacement step size between a first location and a second location. If the largest deflection at a particular location is larger than the threshold deflection, then mapping module 134 may select a second location that is a large step size away from the first location. However, if the largest deflection at the first location is less than the threshold deflection, then mapping module 134 may select a second location that is a small step size away from the first location. Mapping module 134 may then configure mobility unit 140 to move resonator device 100 to the selected second location.

In other embodiments, instead of vibrating single locations, mapping module 134 may configure actuator mechanism 122 to vibrate multiple locations of surface 310 at a time. For instance, mapping module 134 may configure actuator mechanism 122 to use a phased array of transducers to vibrate two or more locations of surface 310 at a time. For example, mapping module 134 may configure the phased array of transducers to vibrate a set of locations disposed linearly on surface 310. Additionally or alternatively, mapping module 134 may configure the phased array of transducers to vibrate a set of locations disposed at distinct points of a grid of surface 310. Furthermore, one or more transducers may further detect reflected pressure waves generated by surface 310. Mapping module 134 may analyze the direction and amplitude of these pressure waves to determine a deflection of surface 310 in response to actuator mechanism 122 vibrating surface 310 at one or more actuation frequencies.

In some embodiments, the resulting resonance map 600 is sent to a client computing device and/or an external data repository. Accordingly, resonance map 600 of surface 310 may be compared to previously generated resonance maps of surface 310 to determine how various properties of surface 310 change with time. Thus, structural degradation and damage can be detected by evaluating how various surface properties change with time. For example, surface degradation may be detected by determining that the deflection and cross-sectional length of a deformation in response to particular set of actuation parameters is significantly larger in resonance map 600 than in a previously generated resonance map.

Figure 7:
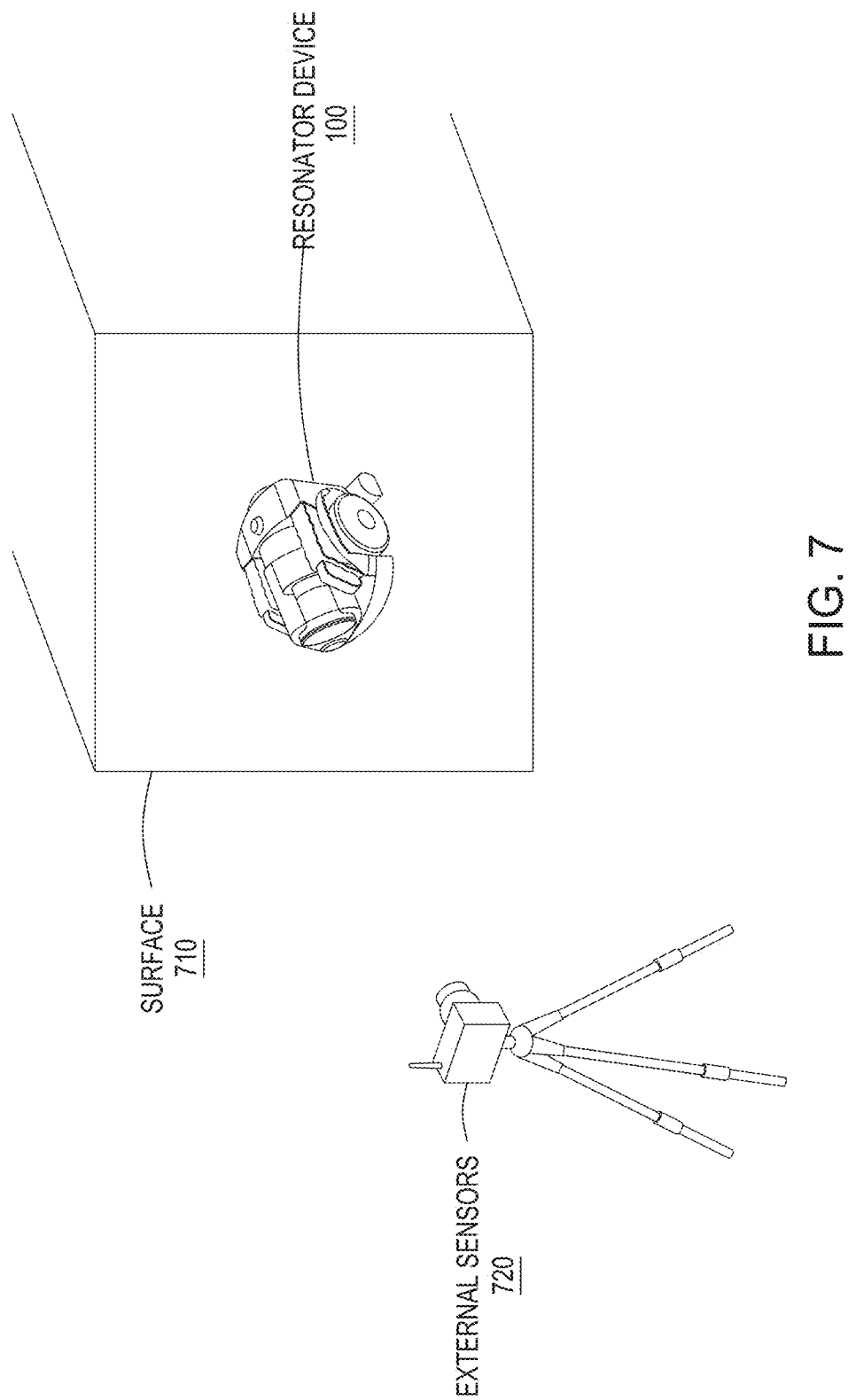
FIG. 7 illustrates a second system configuration that includes an external sensor for implementing various embodiments of the present disclosure.

FIG. 7 illustrates a second system configuration that includes an external sensor for implementing various embodiments of the present disclosure. As shown, resonator device 100 is disposed on surface 310. In addition, external sensor 720 images resonator device 100 on surface 310. In one or more embodiments, external sensor 720 may transfer sensor data to resonator device 100 via a network, such as a local area network, Wi-Fi®, Bluetooth®, and/or radio transmitters and/or receivers located on external sensor 720 and resonator device 100. For example, external sensor 720 may generate sensor data that indicates a location of resonator device 100 on surface 310.

In various embodiments, sound production module 136 utilizes resonance map 600 to generate sounds from surface 310. In operation, sound production module 136 receives a sound tone to produce on surface 310. For example, sound production module 136 could receive the sound tone from an external entertainment system. In particular, I/O device 120 could include a radio receiver that receives radio transmissions. In other embodiments, I/O devices 120 could include a microphone that receives ambient sounds in a room. Additionally or alternatively, I/O devices 120 could receive sound tones via a network, such as a local area network. In other embodiments, I/O devices 120 may receive encoded signals via other types of transmissions, such as laser transmissions, infrared transmissions, wireless transmission, and so forth.

In some embodiments, sound production module 136 may receive a multi-frequency audio signal. Sound production module 136 decomposes the audio signal into component frequencies. For example, a multi-frequency audio signal may include sound at 320 Hz, 432 Hz, 440 Hz, and 562 Hz. Sound production module 136 identifies each of the component frequencies in the received audio signal. Sound production module 136 may further identify an amplitude associated with each component frequency. Further, sound production module 136 may identify changes in the amplitude with time. For example, frequency 320 Hz may be the largest amplitude frequency component for a first time interval and then be the smallest amplitude frequency component for the remainder of the audio signal. However, another frequency component (e.g., 440 Hz) may only have a non-zero amplitude after the first time interval. Accordingly, sound production module 136 analyzes the received audio signal to identify the amplitude behavior of each component frequency.

In addition, sound production module 136 accesses resonance map 600 stored in database 138 and/or an external data repository. Sound production module 136 searches through data points in resonance map 600 to determine the locations associated with frequencies near one or more of the component frequencies. For instance, sound production module 136 may identify a data point that has a large deflection when vibrated at an actuation frequency close to 440 Hz. In addition, sound production module 136 may identify another data point of resonance map 136 that also has a large deflection at 562 Hz.

Based on resonance map 600, sound production module 136 selects a location of surface 310 to vibrate in order to reproduce the received audio signal. In some embodiments, sound production module 136 selects a single component frequency to generate. For example, sound production module 136 may select the frequency component with the largest average amplitude. Sound production module may then select a location on surface 310 that has the largest deflection for the selected frequency component. Sound production module 136 may then configure mobility unit 140 to move resonator device 100 to the location and configure actuator mechanism 122 to vibrate surface 310 as the component frequency to produce a sound tone.

Additionally or alternatively, one or more resonator devices 100 may include sound production modules 136. Each sound production module 136 may select a different frequency component to produce. Each sound production module 136 may further search through data points in resonance map 600 to select a location of surface 310 the has a large deflection when vibrated at the selected component frequency. Each sound production module 136 may configure the corresponding mobility unit 140 to move resonator device 100 to the designated location of surface 310. Further, each sound production module 136 configures actuator mechanism 122 to vibrate surface 310 at the designated frequency. In addition, each sound production module 136 may further vary the average actuation force 410 to match the amplitude variations of the corresponding component frequency.

In other embodiments, sound production module 136 may be included in a central processing unit 110 that controls a set of resonator devices 100. Sound production module 136 may then identify component frequencies in the received audio signal and search through resonance map 600 to identify a set of locations of surface 310 than have a large deflection to each component frequency. Sound production module 136 may further configure each mobility unit 140 to move a corresponding resonator device 100 to a different location in the set of locations. Sound production module 136 may then configure each actuator mechanism 122 to vibrate each location at an actuation frequency that matches the corresponding component frequency.

For example, mobility unit 140 may include a quadrotor system. Actuator mechanism 122 may include pneumatic devices and/or electroacoustic transducers and sensors 124 may include laser-based optical sensors. Mapping module 134 may configure mobility unit 140 to move resonator device 100 along one or more surfaces 310. Mapping module 134 may generate resonance map 600 by configuring actuator mechanism 122 to vibrate surface 310 at one or more frequencies and configuring sensors 124 to generate sensor data indicative of a deflection of surface 310 responsive to the vibration. Mapping module 134 may further generate data points for each location on surface 310 that include a largest deflection and a corresponding actuation frequency. Mapping module 134 builds resonance map 600 based on the generated data points.

Sound production module 136 may receive an audio signal to generate on surface 310 via a local area network. Sound production module 136 searches through resonance map 600 to determine one or more locations of surface 310 that have a specific resonance characteristic. For example, sound production module 136 may search through data points to identify locations that exhibited a small deflection when vibrated. Sound production module 136 may further select a location of surface 310 that exhibits the desired surface properties and configure mobility unit 140 to move resonator device 100 to the selected location. In some embodiments, sound production module 136 may further configure one or more beam forming speakers to output the received audio signal to a location of surface 310 that exhibits a small deflection when vibrated. Accordingly, the selected location of surface 310 may reflect audio sound effectively due to the small deflection response of the surface. In this manner, sound production module 136 may configure resonator device 100 to transmit audio to one or more selected locations by reflecting audio signals off of non-resonant locations of surface 310.

Figure 8:
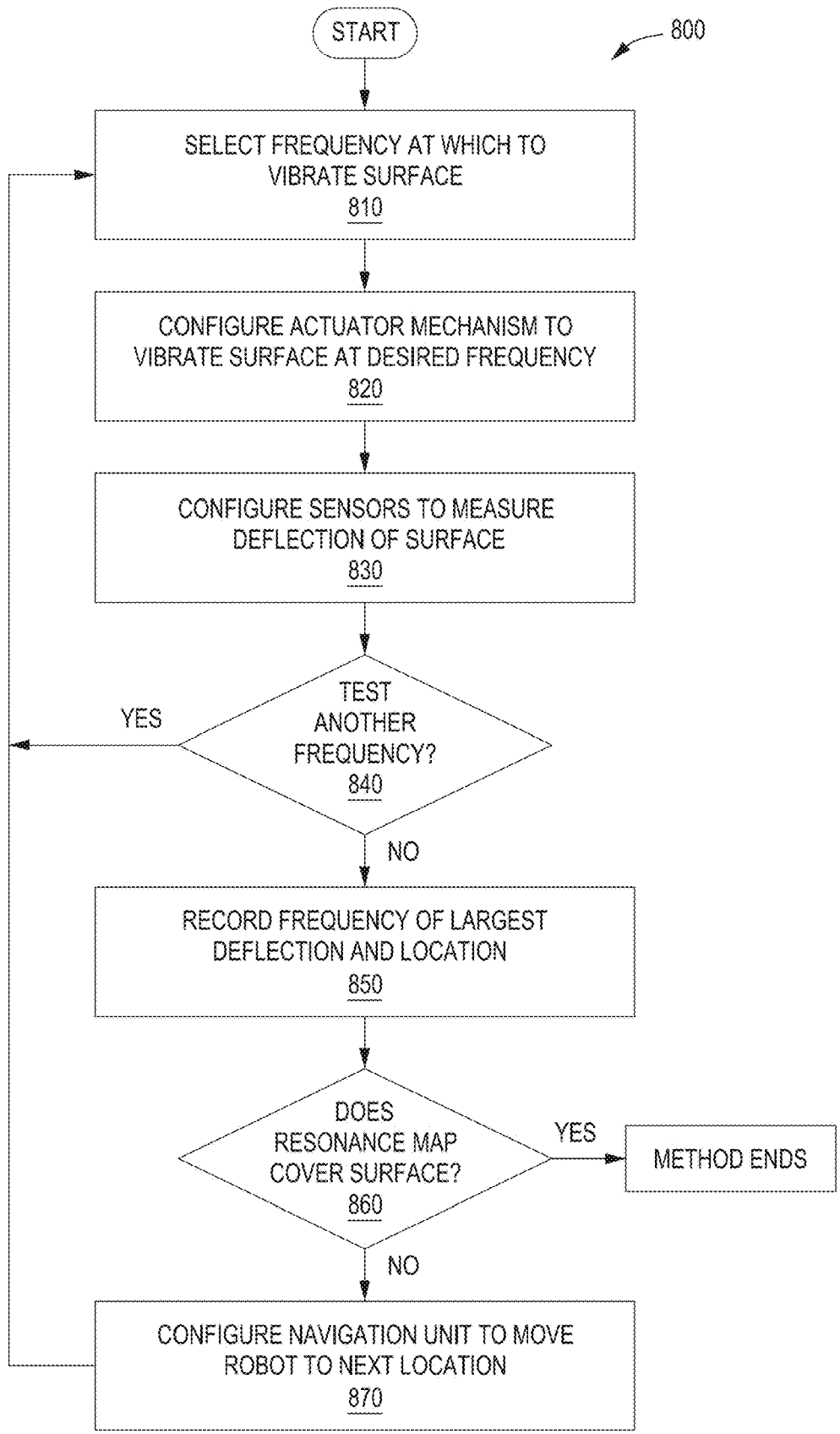
FIG. 8 illustrates a flow diagram of method steps for generating a resonance map, according to various embodiments.

FIG. 8 illustrates a flow diagram of method steps for generating a resonance map, according to various embodiments. Although the method steps are described in conjunction with the system of FIGS. 1, 2, 3A-3B, and 4-7, persons skilled in the art will understand that any system configured to perform the method steps, in any order, falls within the scope of the present invention.

As shown in FIG. 8, a method 800 begins at step 810, where mapping module 134 selects a frequency at which to vibrate surface 310. In various embodiments, mapping module 134 configures actuator mechanism 122 to vibrate surface 310 at a single actuation frequency 510. Additionally or alternatively, mapping module 134 may configure actuator mechanism 122 to vibrate surface 310 at a set of actuation frequencies 510. In addition, mapping module 134 may configure actuator mechanism 122 to vary an average actuation force 410 exerted on surface 310. Then, at step 820, the mapping module 134 configures actuator mechanism 122 to vibrate surface 310 at the desired actuation frequency and/or set of actuation frequencies.

At step 830, mapping module 134 configures sensors 124 to measure a deflection of surface 310. In various embodiments, when actuator mechanism 122 vibrates surface 310, stress forces are generated within surface 310 that may generate a deformation A 340 in surface 310. Mapping module 134 configures sensors 124 to measure various aspects of deformation A 340 including the deflection A 330.

At step 840, mapping module 134 determines whether to test another frequency. For example, mapping module 134 may determine a set of frequencies to test on each location of surface 310. If mapping module 134 determines that another frequency should be tested, then the method 800 returns to step 810, where mapping module 134 determines a frequency at which to configure actuator mechanism 122 to vibrate surface 310.

If mapping module 134 determines not to test another frequency, then the method 800 continues to step 850, where mapping module 134 records the frequency corresponding to the largest deflection in database 138 (e.g., deflection B 335). In other embodiments, mapping module 134 may record a set of frequencies that correspond to the largest deflection. At step 860, mapping module 134 determines whether the set of data points in resonance map 600 covers surface 310. In some embodiments, mapping module 134 may implement sensors 124 to determine whether the set of data points in resonance map 600 corresponds to the full extent of surface 310. If mapping module 134 determines that resonance map 600 covers surface 310, then the method 800 ends. Alternatively, if mapping module 134 determines that resonance map 600 does not cover surface 310, then the method 800 continues to step 870 where mapping module 134 configures mobility unit 140 to move resonator device 100 to another location of surface 310. For example, mapping module 134 may implement a surface covering algorithm in determine a direction in which to move resonator device 100. In addition, mapping module 134 may determine a distance to configure mobility unit 140 to move resonator device 100 based on a whether the largest deflection at the previous location exceeded a threshold value. The method 800 further continues to step 810 where mapping module 134 determines a frequency at which to configure actuation module 122 to vibrate surface 310.

Figure 9:
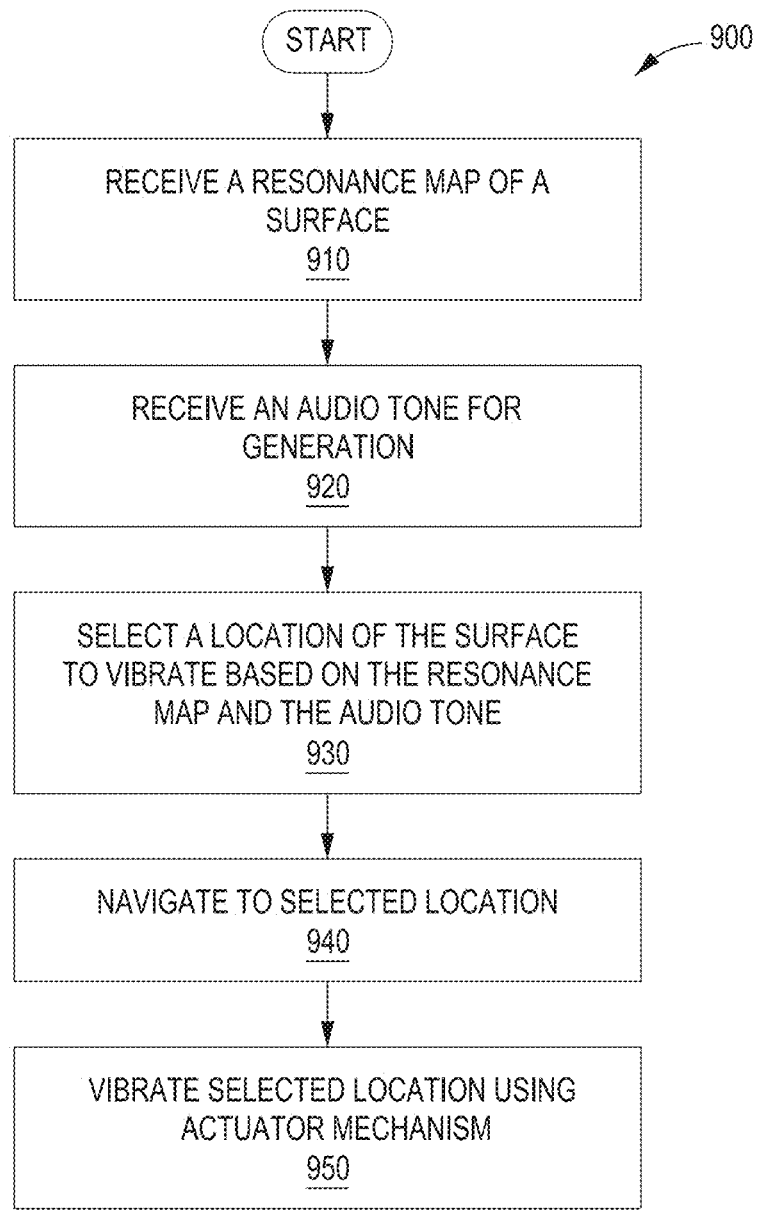
FIG. 9 illustrates a flow diagram of method steps for producing a sound tone from a surface by utilizing a resonance map, according to various embodiments.

FIG. 9 illustrates a flow diagram of method steps for producing a sound tone from a surface by utilizing a resonance map, according to various embodiments. Although the method steps are described in conjunction with the system of FIGS. 1, 2, 3A-3B, and 4-7, persons skilled in the art will understand that any system configured to perform the method steps, in any order, falls within the scope of the present invention.

As shown in FIG. 9, a method 900 begins at step 910, where sound production module 136 receives a resonance map 600 of a surface 310. Resonance map 600 includes one or more resonance characteristics of various locations of surface 310. At step 920, sound production module 136 receives a sound tone to generate. In various embodiments, sound production module 136 analyzes the received sound tone to determine one or more component frequencies within the received sound tone. At step 930, sound production module 136 selects a location of surface 310 that exhibits a desired resonance characteristic. For instance, sound production module 136 may select a location of surface that exhibits a large deflection to a particular component frequency.

At step 940, sound production module 136 configures mobility unit 140 to move resonator device 100 to the selected location. At step 950, sound production module 136 configures actuator mechanism 122 to vibrate surface 310 at the component frequency. In other embodiments, sound production module 136 configures one or more speakers included in I/O devices 120 to broadcast a directional audio signal to surface 310. The direction audio signal reflects off of surface 310 in order to send targeted sound to various positions within the environment around surface 310.

In sum, the application includes a mapping module and a sound production module. The mapping module selects a location of a surface for testing and configures a mobility unit to move a resonator device to the location. The mapping module further configures the actuator mechanism to vibrate the surface at one or more frequencies. The sensors generate sensor data that indicates the deflection of the surface in response to various vibration frequencies. The mapping module generates a data point that includes the location of the resonator device, one or more vibration frequencies, and corresponding deflections of the surface.

In addition, the sound production module receives a sound tone to generate. The sound production module accesses a resonance map stored in a database, selects a location of the surface to vibrate, and a selected frequency at which to vibrate the selected location in order to generate the received sound tone. The sound production module configures the mobility unit to move the resonator device to the selected location. The sound production module further configures the actuator mechanism to vibrate the surface at the selected frequency in order to generate the received sound tone.

At least one advantage of the techniques described herein is that the resonator device can determine various resonance properties of a surface after the surface is already assembled. Accordingly, the resonator device can more accurately detect the resonance frequencies of the surface over conventional techniques that only test the resonance properties of surfaces outside of a structure. In addition, the resonator device is mobile and can access hard-to-reach surfaces and/or surfaces located in parts of a structure that are unsafe for a human to access. Thus, the resonator device increases the number of surfaces that can be tested, while improving the safety of resonance testing for users. Finally, the resonator device can also implement a resonance map to vibrate surfaces to produce sound. The produced sound can be used for a variety of purposes such as noise cancellation and entertainment audio production.

1. In some embodiments, a resonator device for generating a resonance map of a surface comprises an actuator mechanism configured to vibrate the surface, one or more sensors configured to detect a deformation on the surface, and a processor configured to generate the resonance map based on the detected deformation, wherein the resonance map specifies one or more resonance properties for each of a plurality of locations on the surface.

2. The resonator device of clauses 1, further comprising a mobility unit configured to move the resonator device along the surface.

3. The resonator device of clause 1 or 2, wherein the mobility unit is configured to detect a position of the resonator device on the surface.

4. The resonator device of any of clauses 1-3, wherein the one or more sensors comprises at least one of an optical sensor, an acoustic sensor, and a contact sensor.

5. The resonator device of any of clauses 1-4, wherein the actuator mechanism comprises at least one of a piston configured to exert a mechanical force into or along a surface and an electroacoustic transducer configured to direct a non-contact force onto a surface.

6. The resonator device of any of clauses 1-5, wherein the actuator mechanism further comprises a phased array of transducers configured to vibrate two or more locations on the surface, and detect pressure waves generated by the vibrating surface.

7. The resonator device of any of clauses 1-6, wherein a second processor included in a second resonator device is communicatively coupled to the processor, and wherein the second processor determines at least one of a second location of the surface to vibrate and a second type of a second actuator mechanism to use in vibrating the surface based on at least one of a first location and a type of the actuator mechanism used to vibrate the first location.

8. The resonator device of any of clauses 1-7, wherein a first resonance property of a first location of the plurality of locations comprises a maximum deflection by which the surface is deformed when a given force is exerted on the surface at the first location.

In some embodiments, a method for generating a resonance map comprises vibrating a surface, detecting a deformation of the surface caused by the vibration, and generating a resonance map based on one or more aspects of the deformation, wherein the resonance map specifies one or more resonance properties for each of a plurality of locations on the surface.

10. The method of clause 9, wherein detecting the deformation further comprises detecting one or more of a deflection, a cross-sectional length, and a shape of the deformation.

11. The method of clause 9 or 10, wherein vibrating the surface further comprises vibrating the surface at a first actuation frequency and a first average actuation force.

12. The method of any of clauses 9-11, further comprising analyzing sensor data received from one or more sensors to determine the one or more aspects of the deformation.

13. The method of any of clauses 9-12, wherein generating the resonance map comprises generating a first data point in the resonance map that includes the one or more aspects of the deformation and is associated with a location on the surface.

14. The method of any of clauses 9-13, wherein generating the resonance map comprises receiving sensor data from the one or more sensors indicative of the one or more aspects of the deformation, wherein the one or more aspects includes a deflection, analyzing the sensor data to determine a maximum deflection of the surface, determining at least one of an actuator frequency, an actuator force, an actuator frequency pattern, and an actuator force pattern that corresponds to the maximum deflection, and generating a second data point in the resonance map that includes the maximum deflection and at least one of the corresponding actuator frequency, the actuator force, the actuator frequency pattern, and the actuator force pattern.

15. The method of any of clauses 9-14, further comprising selecting a second location on the surface based on the maximum deflection, and moving a resonator device to the second location.

16. The method of any of clauses 9-15, further comprising analyzing sensor data to determine a location on the surface corresponding to a boundary of at least one of the resonance map and the surface, moving a resonator device to the location, and generating a data point in the resonance map associated with the location.

17. In some embodiments, a non-transitory computer-readable storage medium stores instructions that, when executed by a processor, cause the processor to generate a resonance map of a surface by configuring an actuator mechanism to vibrate the surface, configuring one or more sensors to generate sensor data that indicate a deformation of the surface, and generating a resonance map based on one or more aspects of the deformation, wherein the resonance map specifies one or more resonance properties for each of a plurality of locations on the surface.

18. The non-transitory computer-readable storage medium of clause 17, further comprising the processor configuring the actuator mechanism to vibrate the surface at a first actuation frequency and a first average actuation force.

19. The non-transitory computer-readable storage medium of clause 17 or 18, further comprising the processor configuring the one or more sensors to generate sensor data that indicates a location of a resonator device on the surface.

20. The non-transitory computer-readable storage medium of any of clauses 17-19, wherein generating the resonance map further comprises receiving one or more parameters of the actuator mechanism, and generating a first data point in the resonance map that includes the one or more aspects of the deformation, the one or more parameters of the actuator mechanism, and the location of the resonator device on the surface.

21. In some embodiments, a resonator device for producing sound using a surface comprises one or more sensors configured to detect a location of the resonator device on the surface, a processor configured to determine an actuation frequency at which to vibrate the location to generate a sound tone based on a resonance map, wherein the resonance map specifies one or more resonance properties for each of a plurality of locations on the surface, and an actuator mechanism configured to vibrate the location of the surface to produce the sound tone.

22. The resonator device of clause 21, further comprising a mobility unit configured to move the resonator device between two or more locations on the surface.

23. The resonator device of clause 21 or 22, wherein the actuator mechanism comprises a device that is configured to vibrate the surface with at least one of a direct mechanical force and a non-contact force.

24. The resonator device of any of clauses 21-23, wherein the one or more sensors comprises at least one sensor located on the surface and proximate to the resonator device and at least one sensor located on a second surface.

25. The resonator device of any of clauses 21-24, wherein the actuator mechanism further comprises a phased array of transducers configured to vibrate two or more locations of the surface at a time.

26. The resonator device of any of clauses 21-25, further comprising one or more speakers configured to project the sound tone towards a second location of the surface, wherein the sound tone reflects off of the second location.

27. In some embodiments, a method for producing sound using a surface comprises receiving a sound tone and a resonance map of a surface, wherein the resonance map specifies one or more resonance properties for each of a plurality of locations on the surface, determining a first location of the surface to vibrate based on the sound tone and the resonance map, and configuring an actuator mechanism to vibrate the first location to generate the sound tone.

28. The method of clause 27, further comprising analyzing the sound tone to determine one or more component frequencies.

29. The method of clause 27 or 28, wherein the resonance map comprises a set of data points that each indicate a second location on the surface, a sound frequency for the second location, and an actuation frequency that causes the surface to produce the sound frequency.

30. The method of any of clauses 27-29, further comprising analyzing the set of data points to determine a first data point that includes a third location that produces a second sound frequency that matches at least one of the one or more component frequencies, and a first actuation frequency at which to vibrate the third location in order to generate the second sound frequency.

31. The method of any of clauses 27-30, further comprising analyzing sensor data to determine a fourth location of a resonator device on the surface, and moving the resonator device from the fourth location to the third location.

32. The method of any of clauses 27-31, further comprising analyzing sensor data to determine a fifth location of an obstacle between the fourth location of the resonator device and the third location, and causing the resonator device to move around the obstacle.

33. The method of any of clauses 27-32, wherein the first data point indicates an average actuation force at which to vibrate the third location to cause the surface to produce the second sound frequency.

34. The method of any of clauses 27-33, wherein the first data point includes at least one of an actuation frequency pattern and an actuation force pattern with which to vibrate the third location to cause the surface to produce the second sound frequency.

35. The method of any of clauses 27-34, further comprising determining at least two component frequencies of the sound tone, and, for each of the two component frequencies, determining at least a second location to vibrate to cause the surface to produce a sound frequency that matches the component frequency, and configuring a resonator device to vibrate at least the second location to cause the surface to produce the sound frequency.

36. The method of any of clauses 27-35, further comprising projecting the received sound tone to a second location, via a speaker, wherein the sound tone reflects off of the surface.

37. In some embodiments, a non-transitory computer-readable storage medium storing instructions that, when executed by a processor, cause the processor to produce sound using a surface by receiving a sound tone and a resonance map of the surface, wherein the resonance map specifies one or more resonance properties for each of a plurality of locations on the surface, determining a first location of the surface to vibrate based on the sound tone and the resonance map, and configuring an actuator mechanism to vibrate the first location to generate the sound tone.

38. The non-transitory computer-readable storage medium of clause 37, wherein the instructions further cause the processor to analyze the sound tone to determine one or more component frequencies.

39. The non-transitory computer-readable storage medium of clause 37 or 38, wherein the resonance map comprises a set of data points that each indicate a second location on the surface, a sound frequency that corresponds to the location, and an actuation frequency for the surface to produce the sound frequency.

40. The non-transitory computer-readable storage medium of any of clauses 37-39, wherein the instructions further cause the processor to analyze the set of data points to determine a first data point that includes a third location for producing a second sound frequency that matches at least one of the one or more component frequencies, and a first actuation frequency at which to vibrate the third location in order to generate the second sound frequency.

Any and all combinations of any of the claim elements recited in any of the claims and/or any elements described in this application, in any fashion, fall within the contemplated scope of the present invention and protection The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A resonator device for generating a resonance map of a surface, the resonator device comprising:
   an actuator mechanism configured to vibrate the surface;
   a mobility unit configured to move the actuator mechanism along the surface;
   one or more sensors configured to detect a deformation on the surface; and
   a processor coupled to the mobility unit that:
      configures the mobility unit to move the actuator mechanism to a position on the surface, and
      generates the resonance map based on the detected deformation, wherein the resonance map specifies one or more resonance properties for each of a plurality of locations on the surface.

2. The resonator device of claim 1, wherein the mobility unit is configured to detect the position of the actuator mechanism on the surface.

3. The resonator device of claim 1, wherein the one or more sensors comprises at least one of an optical sensor, an acoustic sensor, or a contact sensor.

4. The resonator device of claim 1, wherein the actuator mechanism comprises at least one of:
   a piston configured to exert a mechanical force into or along the surface; or
   an electroacoustic transducer configured to direct a non-contact force onto the surface.

5. The resonator device of claim 1, wherein the actuator mechanism further comprises a phased array of transducers configured to:
   vibrate two or more locations on the surface; and
   detect pressure waves generated by the vibrating surface.

6. The resonator device of claim 1, wherein a second processor included in a second resonator device is communicatively coupled to the processor, and wherein the second processor determines at least one of a second location of the surface to vibrate or a second type of a second actuator mechanism to use in vibrating the surface based on at least one of a first location or a type of the actuator mechanism used to vibrate the first location.

7. The resonator device of claim 1, wherein a first resonance property of a first location of the plurality of locations comprises a maximum deflection by which the surface is deformed when a given force is exerted on the surface at the first location.

8. A method for generating a resonance map, the method comprising:
   configuring, by a processor, a mobility unit to move an actuator mechanism to a position on a surface;
   vibrating the surface via the actuator mechanism;
   detecting a deformation of the surface caused by the vibration; and
   generating a resonance map based on one or more aspects of the deformation, wherein the resonance map specifies one or more resonance properties for each of a plurality of locations on the surface.

9. The method of claim 8, wherein detecting the deformation further comprises detecting one or more of a deflection, a cross-sectional length, or a shape of the deformation.

10. The method of claim 8, wherein vibrating the surface further comprises vibrating the surface at a first actuation frequency and a first average actuation force.

11. The method of claim 8, further comprising analyzing sensor data received from one or more sensors to determine the one or more aspects of the deformation.

12. The method of claim 8, wherein generating the resonance map comprises generating a first data point in the resonance map that includes the one or more aspects of the deformation and is associated with a location on the surface.

13. The method of claim 8, wherein generating the resonance map comprises:
   receiving sensor data from one or more sensors indicative of the one or more aspects of the deformation, wherein the one or more aspects includes a deflection;
   analyzing the sensor data to determine a maximum deflection of the surface;
   determining at least one of an actuator frequency, an actuator force, an actuator frequency pattern, or an actuator force pattern that corresponds to the maximum deflection; and
   generating a second data point in the resonance map that includes the maximum deflection and at least one of the corresponding actuator frequency, the actuator force, the actuator frequency pattern, or the actuator force pattern.

14. The method of claim 13, further comprising:
   selecting a second location on the surface based on the maximum deflection; and
   configuring the mobility unit to move the actuator mechanism to a second position on the surface based on the second location.

15. The method of claim 8, further comprising:
   analyzing sensor data to determine a location on the surface corresponding to a boundary of at least one of the resonance map or the surface;
   configuring the mobility unit to move the actuator mechanism to a second position on the surface based on the location; and
   generating a data point in the resonance map associated with the location.

16. One or more non-transitory computer-readable storage media storing instructions that, when executed by one or more processors, cause the one or more processors to generate a resonance map of a surface by:
   configuring a mobility unit to move an actuator mechanism to a position on the surface;
   configuring the actuator mechanism to vibrate the surface;
   configuring one or more sensors to generate sensor data that indicate a deformation of the surface; and
   generating the resonance map based on one or more aspects of the deformation, wherein the resonance map specifies one or more resonance properties for each of a plurality of locations on the surface.

17. The one or more non-transitory computer-readable storage media of claim 16, further comprising the one or more processors configuring the actuator mechanism to vibrate the surface at a first actuation frequency and a first average actuation force.

18. The one or more non-transitory computer-readable storage media of claim 17, further comprising the one or more processors configuring the one or more sensors to generate sensor data that indicates a location of a resonator device on the surface.

19. The one or more non-transitory computer-readable storage media of claim 18, wherein generating the resonance map further comprises:
   receiving one or more parameters of the actuator mechanism; and
   generating a first data point in the resonance map that includes:
      the one or more aspects of the deformation,
      the one or more parameters of the actuator mechanism, and
      the location of the resonator device on the surface.

* * * * *